United States Patent
Dequina et al.

(10) Patent No.: US 6,873,191 B2
(45) Date of Patent: Mar. 29, 2005

(54) MECHANISM FOR PROVIDING OVER-VOLTAGE PROTECTION DURING POWER UP OF DC-DC CONVERTER

(75) Inventors: Noel B. Dequina, Flemington, NJ (US); Donald R. Preslar, Hillsborough, NJ (US); Paul K. Sferrazza, New Hope, PA (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 10/685,314

(22) Filed: Oct. 14, 2003

(65) Prior Publication Data

US 2004/0124818 A1 Jul. 1, 2004

Related U.S. Application Data

(60) Provisional application No. 60/437,179, filed on Dec. 31, 2002.

(51) Int. Cl.[7] .............................................. H03K 3/00
(52) U.S. Cl. ....................... 327/110; 327/309; 361/91.1
(58) Field of Search ................................. 327/309, 321, 327/322, 327, 110, 180, 372; 361/91.7, 18, 90.1, 93.9, 91.1; 323/224, 282, 283, 284

(56) References Cited

U.S. PATENT DOCUMENTS

| | | | |
|---|---|---|---|
| 4,727,308 A | 2/1988 | Huljak et al. ............... 323/222 |
| 5,596,466 A | * 1/1997 | Ochi ............................ 361/18 |
| 6,172,550 B1 | * 1/2001 | Gold et al. .................. 327/366 |
| 6,768,228 B1 | * 7/2004 | Fial et al. .................... 307/131 |
| 2002/0145887 A1 | 10/2002 | Ito et al. ....................... 363/16 |

FOREIGN PATENT DOCUMENTS

| | | | | |
|---|---|---|---|---|
| EP | 0987806 A2 | 3/2000 | ............ H02H/7/12 |
| EP | 1239573 A1 | 2/2002 | ............ H02M/1/00 |

* cited by examiner

Primary Examiner—Tuan T. Lam
Assistant Examiner—Hiep Nguyen
(74) Attorney, Agent, or Firm—Allen, Dyer, Doppelt, Milbrath & Gilchrist, P.A.

(57) ABSTRACT

An over-voltage protection circuit prevents an anomaly, such as a short circuit in the upper-switched electronic device of a DC—DC power supply, from propagating to downstream circuitry. The over-voltage protection circuit, which includes an overvoltage sense resistor coupled between an output of the upper or high side FET and the gate of the lower FET, is operative to sense a short circuit fault condition in the circuit path through the upper FET during initial power up of the system. In response to this condition, the lower NFET device is turned on so as to provide an immediate by-pass of the overvoltage condition to ground, and thereby prevent excessive voltage from being applied by the output terminal to downstream powered circuitry.

27 Claims, 4 Drawing Sheets

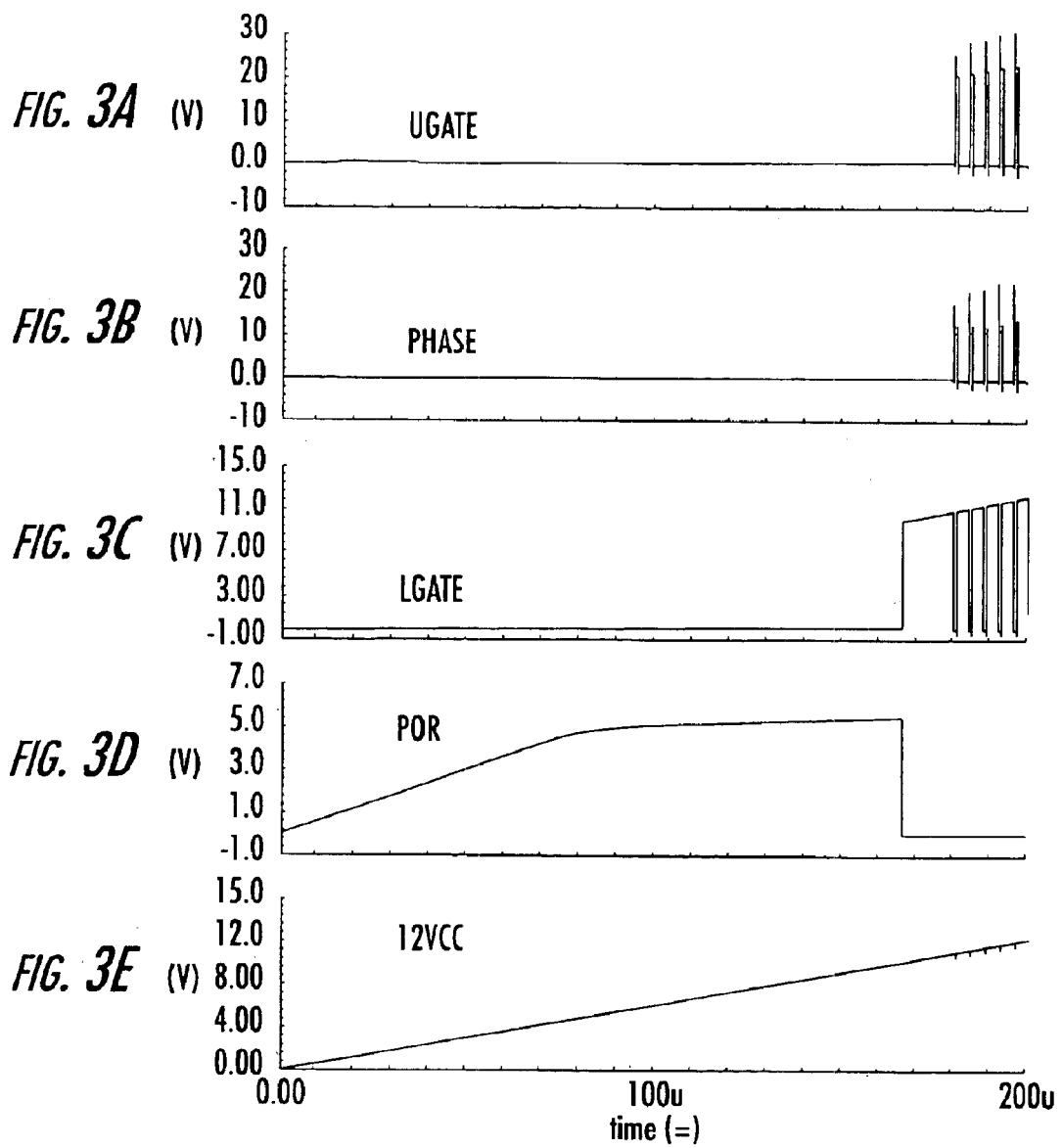

MECHANISM FOR PROVIDING OVER-VOLTAGE PROTECTION DURING POWER UP OF DC-DC CONVERTER

CROSS-REFERENCE TO RELATED APPLICATION

The present application claims the benefit of co-pending U.S. application Ser. No. 60/437,179, filed Dec. 31, 2002, by Noel B. Dequina et al, entitled: "Mechanism for Providing Over-Voltage Protection During Power Up of DC—DC Converter," assigned to the assignee of the present application and the disclosure of which is incorporated herein.

FIELD OF THE INVENTION

The present invention relates in general to DC power supply systems and components therefor, and is particularly directed to a new and improved over-voltage protection apparatus that is configured to sense the onset of an over-voltage condition associated with a shorted upper FET of a DC—DC converter and, in response thereto, to effect a controlled by-pass of the over-voltage condition and shutdown of the power supply, so as to protect electronic circuitry powered thereby.

BACKGROUND OF THE INVENTION

Electrical power for an integrated circuit (IC), such as but not limited to a microprocessor chip of a personal computer, is typically supplied by one or more direct current (battery) power sources, such as a buck-mode, pulse width modulation (PWM) based, DC—DC converter of the type diagrammatically shown in FIG. 1. As shown therein, a PWM control circuit 1 supplies a synchronous PWM signal to a switching circuit driver 2, that controls the turn-on and turn-off of a pair of electronic power switching devices, to which a powered load 9 is coupled. In the illustrated DC—DC converter, the electronic power switching devices comprise an upper (or high side) power NMOSFET (or NFET) device 3, and a lower (or low side) power NFET device 4, having their drain-source current flow paths connected in series between a pair of power supply rails (e.g., VIN and ground (GND)).

The upper NFET device (UFET) 3 is turned on and off by an upper gate-switching signal UGATE applied to its gate from driver 2, while the lower NFET device (LFET) 4 is turned on and off by a lower gate-switching signal LGATE supplied from driver 2. A common or phase node 5 between the two NFETs is coupled through an inductor 6 to a load reservoir capacitor 7 that is coupled to a reference voltage terminal (GND). The connection 8 between inductor 6 and capacitor 7 serves as an output node from which a desired (regulated) DC output voltage Vout is applied to a LOAD 9 (coupled to GND).

The output node connection 8 is also fed back via a feedback resistor 12 to error amplifier circuitry within the PWM controller 1. The error amplifier circuitry is used to regulate the converter's DC output voltage relative to a reference voltage supply. In addition, the common node 5 between the controllably switched NFETs is coupled via a current sense resistor 11 to current-sensing circuitry within the controller 1, in response to which the controller adjusts duty ratio of the PWM signal, as necessary, to maintain the converter's DC output within a prescribed set of parameters.

In the course of supplying power from the power supply to its powered components, it is of critical importance that an anomaly in the power supply path, such as a short circuit in the upper switched NFET (which may be due to a bad component or inadvertent shorting of its drain and during manufacture), not propagate to downstream circuitry, especially a microprocessor chip.

SUMMARY OF THE INVENTION

The present invention successfully addresses this potential problem by means of an over-voltage protection circuit that is incorporated into the FET switching circuitry. This over-voltage protection circuit is operative to sense a short circuit fault condition in the circuit path through the upper or high side FET during initial power up of the system and, in response thereto, to turn on the lower NFET device. This results in an immediate by-pass of the overvoltage condition to ground, and thereby prevents excessive voltage from being applied by the output terminal to downstream powered circuitry.

BRIEF DESCRIPTION OF THE DRAWINGS

FIGS. 3A–3E are timing diagrams associated with the normal power-up operation of a DC—DC converter incorporating the over-voltage protection scheme of FIG. 2.

DETAILED DESCRIPTION

Figure 1:
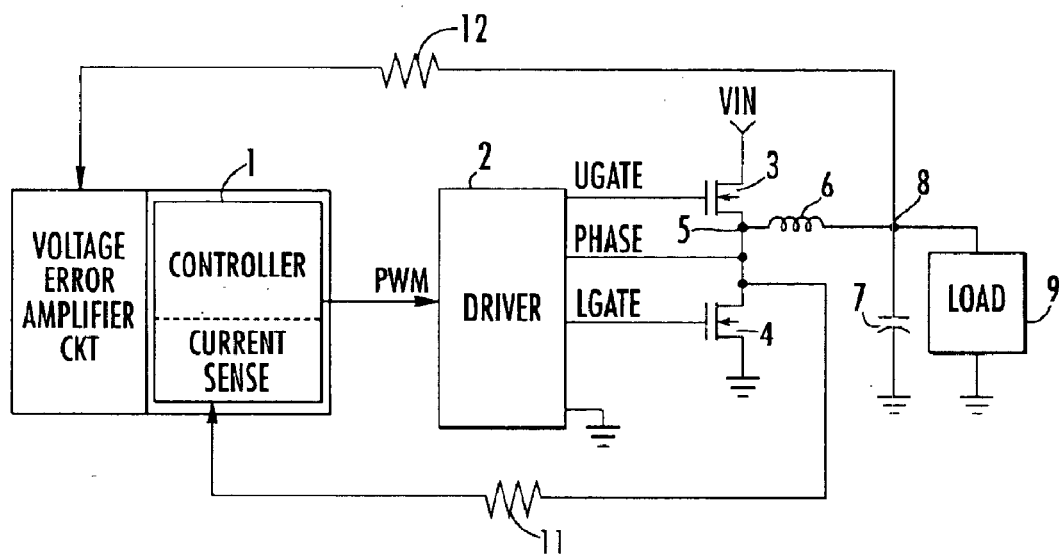
FIG. 1 diagrammatically illustrates a conventional buck-mode, pulse width modulation (PWM) based, DC—DC converter.
Figure 2:
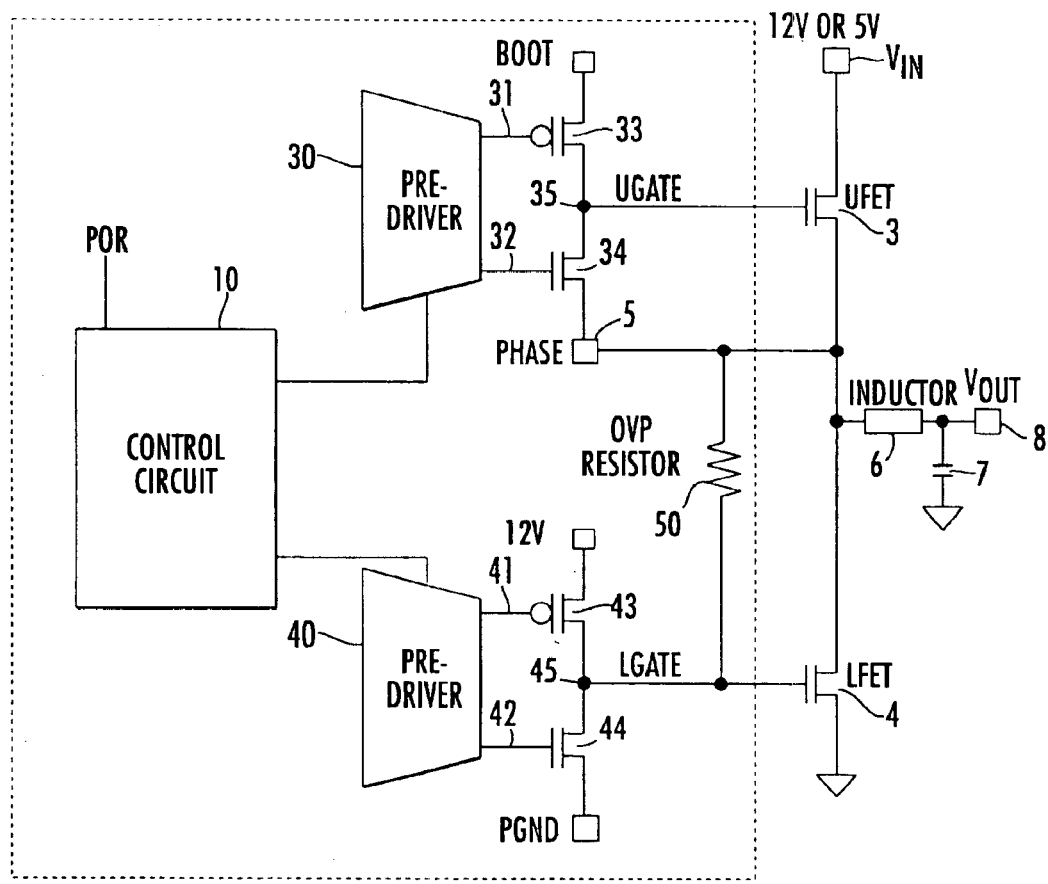
FIG. 2 diagrammatically illustrates an embodiment of the over-voltage protection scheme of the present invention.

Attention is now directed to FIG. 2, wherein an embodiment of the over-voltage protection scheme according to the present invention is diagrammatically illustrated as comprising an overvoltage protection (OVP) control circuit 10, to which a power on reset (POR) signal is supplied, and which is incorporated as an augmentation to the driver circuitry 2 of the circuitry of FIG. 1, described above. Control circuit 10 is operative to perform the functionality of the control circuit 1 of FIG. 1 and incorporates combinational logic and flip-flops that implement the overvoltage protection control functionality described below. The protection circuit of FIG. 2 further includes respective upper and lower pre-driver circuits 30 and 40, which are operative to supply gate drive signals to the upper NFET 3 and lower NFET 4. In addition, an overvoltage protection resistor 50 is coupled between the phase node 5 and the LGATE input to the lower NFET 4.

The upper pre-driver circuit 30 is coupled to receive an upper drive control signal from the OVP controller circuit 10, and has first and second output control lines 31 and 32 coupled to the gates of an upper PFET switch 33 and an upper NFET switch 34, respectively. PFET switch 33 and NFET switch 34 have their source-drain paths coupled in series between a bootstrap supply node BOOT and the PHASE node 5. The common connection 35 of PFET 33 and NFET 34 is coupled as an upper gate drive UGATE to upper NFET 3.

The lower pre-driver circuit 40 is coupled to receive a lower drive control signal from the OVP controller circuit 10, and has first and second output control lines 41 and 42 respectively coupled to the gates of a lower PFET switch 43 and a lower NFET switch 44. PFET switch 43 and NFET switch 44 have their source-drain paths coupled in series between a 12V supply node and a power ground (PGND) node. The common connection 45 of PFET 43 and NFET 44 is coupled as a lower gate drive LGATE to lower NFET 4.

FIGS. 3A–3E are timing diagrams of normal power-up operation, where there is no short across the upper FET 3. In particular, FIG. 3A shows the upper gate UGATE voltage being asserted by the upper predriver circuitry to the gate of upper UFET 3 at a value on the order of zero volts. FIG. 3B shows the phase voltage at phase node 5 also at zero volts. Similarly, FIG. 3C shows the lower gate LGATE voltage being asserted by the lower pre-driver to the gate of LFET 4 at a value on the order of zero volts. FIG. 3D shows the power on reset input voltage ramping up, to track the power supply voltage ramp applied at the voltage input terminal shown in FIG. 3E. Eventually, as shown in FIG. 3D, the operational power level reaches a voltage on the order of 5 VDC. Subsequently, switchmode operation begins, as shown in the right hand portion of the Figures, so that the output node is at its regulated voltage.

Figure 4A:
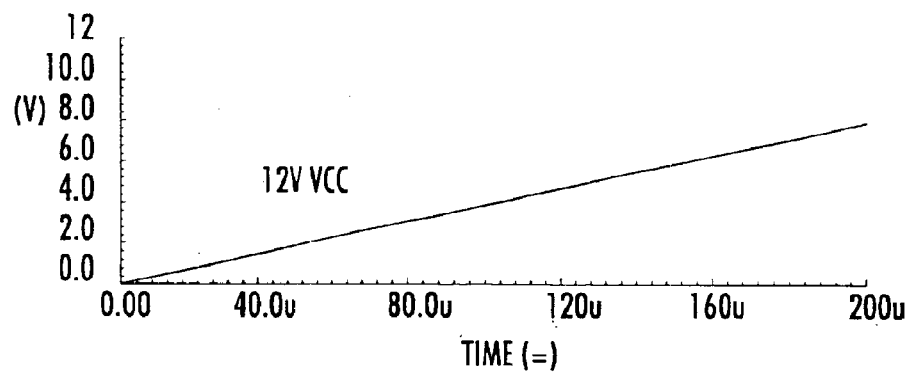
FIGS. 4A–4D are timing diagrams associated with a short across the source-drain path of the upper FET of a DC—DC converter incorporating the over-voltage protection scheme of FIG. 2.
Figure 4B:
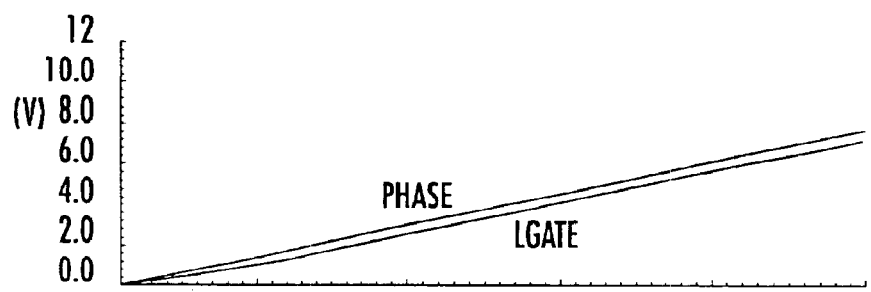

The case where a short occurs across the source-drain path of the upper NFET 3 during power-up is shown in FIGS. 4A–4D. In particular, FIG. 4A shows the voltage at input node Vin ramping up from zero toward 12 volts. With a short across the source and drain of upper NFET 3, this will cause the voltage at the PHASE node 5 to also begin ramping toward the twelve-volt supply rail. As the phase voltage increases, the OVP resistor 50 couples this voltage to the LGATE input of lower NFET 4, as shown in FIG. 4B. In response to this voltage exceeding the threshold voltage of the lower NFET 4, NFET 4 turns on, creating a current path from the power supply input at Vin through the source-drain paths of both UFET 3 and LFET 4 to power ground.

Figure 4C:
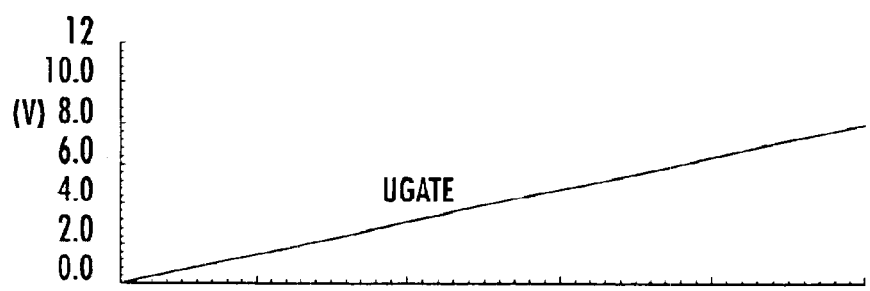
Figure 4D:
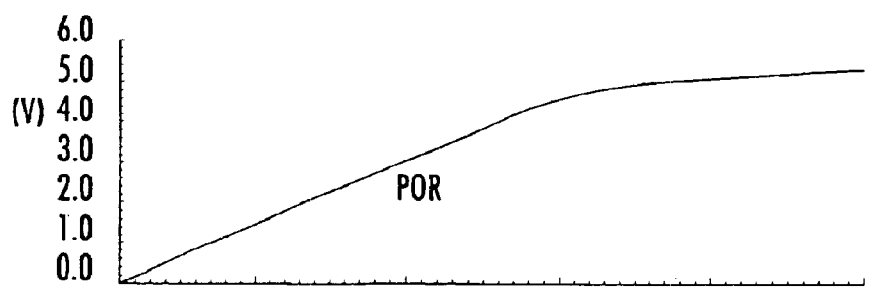

When this happens, the voltage error amplifier in the power supply's control circuitry will detect a short to ground at the supply output, and take action to shut down the operation of the converter to prevent potential damage to powered components. In addition, during this shorted condition, the controller 1 is operative to cause the predriver circuits 30 and 40 to turn off the upper and lower FET pairs 33, 34 and 43, 44. This ensures that the gate drive to LFET 4 tracks only through the OVP resistor 50 to the shorted state of UFET 3. FIG. 4C shows the UGATE ramp, while FIG. 4D shows the power on reset (POR) voltage ramping up to five volts.

As will be appreciated from the foregoing description, the present invention is operative to prevent an anomaly, such as a short circuit in the upper-switched electronic device of a DC—DC power supply, from propagating to downstream circuitry, by means of an over-voltage protection circuit that is incorporated into the FET switching circuitry. This over-voltage protection circuit is operative to sense a short circuit fault condition in the circuit path through the upper or high side FET during initial power up of the system and, in response thereto, to turn on the lower NFET device. This results in an immediate by-pass of the overvoltage condition to ground, and thereby prevents excessive voltage from being applied by the output terminal to downstream powered circuitry.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. An apparatus for generating a regulated direct current (DC) output voltage at an output node to which a powered device is coupled, comprising:

a DC—DC converter coupled to a supply voltage, and being operative to generate a regulated output voltage derived from said supply voltage, said DC—DC converter having a pulse width modulation (PWM) generator which generates a PWM switching signal that switchably controls operation of a switching circuit containing first and second electronic power switching devices coupled between respective first and second power supply terminals, a common node thereof being coupled through an inductor element to said output node; and an overvoltage sense circuit which, monitors the voltage at said common node and is operative, in response to the voltage at said common node reaching a value during initial power up of said apparatus, indicative of the onset of an over-voltage condition at said common node, associated with a short circuit through said first electronic power switching device between said first power supply terminal and said common node, to turn on said second electronic power switching device, so as to provide a by-pass current flow path from said common node to said second power supply terminal, and thereby prevent an over-voltage from being coupled to said output node and applied thereby to said powered device.

2. The apparatus according to claim 1, wherein said overvoltage sense circuit comprises an overvoltage sense resistor coupled between an output of said first electronic power switching device and a control input of said second electronic power switching device.

3. The apparatus according to claim 2, wherein said switching circuit further includes an upper predriver switching circuit comprising third and fourth electronic power switching devices respectively coupled between a third power supply terminal and the common connection of said first and second electronic power switching devices, and having a common node thereof coupled to the control electrode of said first electronic power switching device.

4. The apparatus according to claim 3, wherein said switching circuit further includes a lower predriver switching circuit comprising fifth and sixth electronic power switching devices respectively coupled between a fourth power supply terminal and a power supply reference terminal, and having a common node thereof coupled to the control electrode of said second electronic power switching device.

5. An apparatus for generating a regulated direct current (DC) output voltage at an output node to which a powered device is coupled, comprising:

a DC—DC converter coupled to a supply voltage, and being operative to generate a regulated output voltage derived from said supply voltage, said DC—DC converter having a pulse width modulation (PWM) generator which generates a PWM switching signal that switchably controls operation of a switching circuit containing first and second electronic power switching devices coupled between respective first and second power supply terminals, a common node thereof being coupled through an inductor element to said output node; and an over-voltage protection circuit which monitors the voltage at said common node and is operative, in response to the voltage at said common node reaching a value during initial power up of said apparatus, indicative of the onset of an over-voltage condition at said common node associated with a short circuit through said first electronic power switching device between said first power supply terminal and said common node, to effect a controlled by-pass of the onset of said over-voltage condition away from said output node and shut-down of the power supply, so as to protect electronic circuitry powered thereby.

6. The apparatus according to claim 5, wherein said overvoltage sense circuit is operative, in response to a short across the controlled current flow path of said first power switching device, to turn on said second electronic power switching device so as to provide an over-voltage, by-pass current flow path between said first and second power supply terminals, and thereby prevent said over-voltage from being applied from said output node to said powered device.

7. The apparatus according to claim 5, wherein said overvoltage sense circuit comprises an over-voltage sense resistor coupled between an output of said first electronic power switching device and a control input of said second electronic power switching device.

8. The apparatus according to claim 7, wherein said switching circuit further includes an upper predriver switching circuit comprising third and fourth electronic power switching devices respectively coupled between a third power supply terminal and the common connection of said first and second electronic power switching devices, and having a common node thereof coupled to the control electrode of said first electronic power switching device.

9. The apparatus according to claim 8, wherein said switching circuit further includes a lower predriver switching circuit comprising fifth and sixth electronic power switching devices respectively coupled between a fourth power supply terminal and a power supply terminal, and having a common node thereof coupled to the control electrode of said second electronic power switching device.

10. A method for controlling the operation of a DC—DC converter, which is operative to generate a regulated direct current (DC) output voltage at an output node to which a powered device is coupled, said DC—DC converter being coupled to a supply voltage, and being operative to generate said regulated output voltage derived from said supply voltage, and having a pulse width modulation (PWM) generator which generates a PWM switching signal that switchably controls operation of a switching circuit containing first and second electronic power switching devices coupled between respective first and second power supply terminals, a common node thereof being coupled through an inductor element to said output node terminal, said method comprising the steps of:
  (a) monitoring, the voltage at said common node for the occurrence of an over-voltage condition associated with a shorted condition of first power supply terminal to said common node through said first electronic power switching device; and
  (b) in response to detecting said over-voltage condition at said common node, providing a by-pass thereof, and shut-down of the power supply, so as to protect electronic circuitry powered thereby.

11. The method according to claim 10, wherein step (b) comprises, in response to a short across the controlled current flow path of said first power switching device, turning on said second electronic power switching device so as to provide an over-voltage, by-pass current flow path between said first and second power supply terminals, and thereby prevent said over-voltage from being applied from said output node to said powered device.

12. The method according to claim 10, wherein step (b) comprises coupling an overvoltage sense resistor between an output of said first electronic power switching device and a control input of said second electronic power switching device and, in response to said overvoltage sense resistor sensing a short across the controlled current flow path of said first power switching device, controllably turning on said second electronic power switching device so as to provide an over-voltage, by-pass current flow path between said first and second power supply terminals, and thereby prevent said over-voltage from being applied from said output node to said powered device.

13. The method according to claim 12, wherein said switching circuit further includes an upper predriver switching circuit comprising third and fourth electronic power switching devices respectively coupled between a third power supply terminal and the common connection of said first and second electronic power switching devices, and having a common node thereof coupled to the control electrode of said first electronic power switching device.

14. The method according to claim 13, wherein said switching circuit further includes a lower predriver switching circuit comprising fifth and sixth electronic power switching devices respectively coupled between a fourth power supply terminal and a power supply reference terminal, and having a common node thereof coupled to the control electrode of said second electronic power switching device.

15. The apparatus according to claim 4, wherein said PWM generator includes a controller which is operative to turn off said third and fourth electronic power switching devices of said upper predriver switching circuit and said fifth and sixth electronic power switching devices of said lower predriver switching circuit during said short circuit through said first electronic power switching device.

16. The apparatus according to claim 9, wherein said PWM generator includes a controller which is operative to turn off said third and fourth electronic power switching devices of said upper predriver switching circuit and said fifth and sixth electronic power switching devices of said lower predriver switching circuit during said short circuit through said first electronic power switching device.

17. The apparatus according to claim 14, wherein said PWM generator includes a controller which is operative to turn off said third and fourth electronic power switching devices of said upper predriver switching circuit and said fifth and sixth electronic power switching devices of said lower predriver switching circuit during said short circuit through said first electronic power switching device.

18. An apparatus for generating a regulated direct current (DC) output voltage at an output node to which a powered device is coupled, comprising:
  a DC—DC converter coupled to a supply voltage, and being operative to generate a regulated output voltage derived from said supply voltage, said DC—DC converter having a pulse width modulation (PWM) generator which generates a PWM switching signal that switchably controls operation of a switching circuit containing first and second electronic power switching devices coupled between respective first and second power supply terminals, a common node thereof being coupled through an inductor element to said output node; and
  a by-pass circuit, which is operative, without monitoring the voltage at said output node, to detect a short circuit through said first switching device between said first power supply terminal and said common node, and to turn on said second electronic power switching device, so as to provide a by-pass current flow path f rpm said common node to said second power supply terminal, and thereby prevent an over-voltage from being applied to said output node and said powered device.

19. The apparatus according to claim 18, wherein said by-pass circuit comprises a sense resistor coupled between said common node and a control input of said second electronic power switching device.

20. The apparatus according to claim 19, wherein said switching circuit further includes an upper predriver switching circuit comprising third and fourth electronic power switching devices respectively, coupled between a third power supply terminal and the common connection of said first and second electronic power switching devices, and having a common node thereof coupled to the control electrode of said first electronic power switching device.

21. The apparatus according to claim 20, wherein said switching circuit further includes a lower predriver switching circuit comprising fifth and sixth electronic power switching devices respectively coupled between a fourth power supply terminal and a power supply reference terminal, and having a common node thereof coupled to the control electrode of said second electronic power switching device.

22. The apparatus according to claim 21, wherein said PWM generator includes a controller which is operative to turn off said third and fourth electronic power switching devices of said upper predriver switching circuit and said fifth and sixth electronic power switching devices of said lower predriver switching circuit during said short circuit through said first electronic power switching device.

23. A method for controlling the operation of a DC—DC converter, which is operative to generate a regulated direct current (DC) output voltage at an output node to which a powered device is coupled, said DC—DC converter being coupled to a supply voltage, and being operative to generate said regulated output voltage derived from said supply voltage, and having a pulse width modulation (PWM) generator which generates a PWM switching signal that switchably controls operation of a switching circuit containing first and second electronic power switching devices coupled between respective first and second power supply terminals, a common node thereof being coupled through an inductor element to said output node, said method comprising the steps of:

(a) monitoring said common node, and exclusive of the voltage at said output node, for the onset of an over-voltage condition associated with a short circuit from said first power supply terminal through said first switching device to said common node; and (b) in response to detecting said onset of an over-voltage condition at said common node, providing a by-pass through said second switching device to said second power supply terminal, and shut-down of the power supply, so as to protect electronic circuitry powered thereby from said over-voltage.

24. The method according to claim 23, wherein step (b) comprises coupling a sense resistor between said common node and a control input of said second electronic power switching device and, in response to said over-voltage sense resistor sensing a prescribed voltage at said common node, turning on said second electronic power switching device so as to provide a by-pass current flow path between said common node and said second power supply terminal, and thereby prevent an over-voltage from being applied to said output node and said powered device.

25. The method according to claim 24, wherein said switching circuit further includes an upper predriver switching circuit comprising third and fourth electronic power switching devices respectively coupled between a third power supply terminal and the common connection of said first and second electronic power switching devices, and having a common node thereof coupled to the control electrode of said first electronic power switching device.

26. The method according to claim 25, wherein said switching circuit further includes a lower predriver switching circuit comprising fifth and sixth electronic power switching devices respectively coupled between a fourth power supply terminal and power supply reference terminal, and having a common node thereof coupled to the control electrode of said second electronic power switching device.

27. The apparatus according to claim 26, wherein said PWM generator includes a controller which is operative to turn off said third and fourth electronic power switching devices of said upper predriver switching circuit and said fifth and sixth electronic power switching devices of said lower predriver switching circuit during said short circuit through said first electronic power switching device.

* * * * *